United States Patent
Kuure et al.

(10) Patent No.: US 8,077,653 B2
(45) Date of Patent: Dec. 13, 2011

(54) COMMUNICATION METHOD, MOBILE TERMINAL, AND COMPUTER PROGRAM

(75) Inventors: Pekka Kuure, Espoo (FI); Jarkko Jouppi, Tampere (FI); Erkka Ala-Tauriala, Helsinki (FI)

(73) Assignee: Nokia Corporation, Espoo (FI)

( * ) Notice: Subject to any disclaimer, the term of this patent is extended or adjusted under 35 U.S.C. 154(b) by 1118 days.

(21) Appl. No.: 10/809,165

(22) Filed: Mar. 25, 2004

(65) Prior Publication Data

US 2005/0213530 A1    Sep. 29, 2005

(51) Int. Cl.
*H04W 4/00* (2009.01)
*H04J 3/12* (2006.01)

(52) U.S. Cl. ............ 370/328; 370/522; 370/93.35; 370/338; 370/352; 455/550.1; 455/414.1; 455/414.2; 455/414.3

(58) Field of Classification Search ........ 370/328, 370/329, 330, 333, 335, 339, 395.5, 522, 370/338, 340, 93.35, 352, 312, 401, 389; 455/414.1, 550.1, 415, 445, 414.3, 414.4; 709/217, 218, 203, 219, 226, 222–225, 229; 725/34, 87
See application file for complete search history.

(56) References Cited

U.S. PATENT DOCUMENTS

| | | | |
|---|---|---|---|
| 5,982,774 A * | 11/1999 | Foladare et al. | 370/401 |
| 6,144,644 A * | 11/2000 | Bajzath et al. | 370/259 |
| 6,178,183 B1 * | 1/2001 | Buskirk, Jr. | 370/493 |
| 6,188,886 B1 * | 2/2001 | Macaulay et al. | 455/415 |
| 7,031,746 B2 * | 4/2006 | Na et al. | 455/550.1 |
| 7,225,260 B2 * | 5/2007 | Herrod | 709/227 |
| 2001/0013128 A1 * | 8/2001 | Hagai et al. | 725/90 |
| 2002/0122401 A1 * | 9/2002 | Xiang et al. | 370/338 |
| 2003/0027566 A1 * | 2/2003 | Weiner | 455/426 |
| 2004/0203674 A1 * | 10/2004 | Shi et al. | 455/415 |
| 2004/0259500 A1 * | 12/2004 | Kim | 455/41.2 |
| 2005/0099984 A1 * | 5/2005 | Alakoye et al. | 370/338 |
| 2005/0123108 A1 * | 6/2005 | Smith | 379/93.35 |
| 2006/0247042 A1 * | 11/2006 | Walker et al. | 463/29 |
| 2008/0287110 A1 * | 11/2008 | Griffin | 455/414.1 |

FOREIGN PATENT DOCUMENTS

WO    WO 02/067605 A1    8/2002

OTHER PUBLICATIONS

Jul. 2000, GSM, Digital cellular telecommunications system, General Packet Radio Service, Service description, ETSI TS 101 113, version 7.5.0, Release 1998.

\* cited by examiner

*Primary Examiner* — Wayne Cai
*Assistant Examiner* — Julio Perez
(74) *Attorney, Agent, or Firm* — Hollingsworth & Funk, LLC

(57) ABSTRACT

A communication method, a mobile terminal and a computer program are provided. According to the invention, data streaming communication is performed to the mobile terminal, a communication connection request message is received from the network infrastructure in the mobile terminal, the reception of the communication connection request is indicated to a user of the mobile terminal, a first mode change command generated by the user is received in the mobile terminal, suspension of the data streaming communication is requested for on the basis of the first mode change command, and the communication connection is accepted on the basis of the first mode change command.

28 Claims, 7 Drawing Sheets

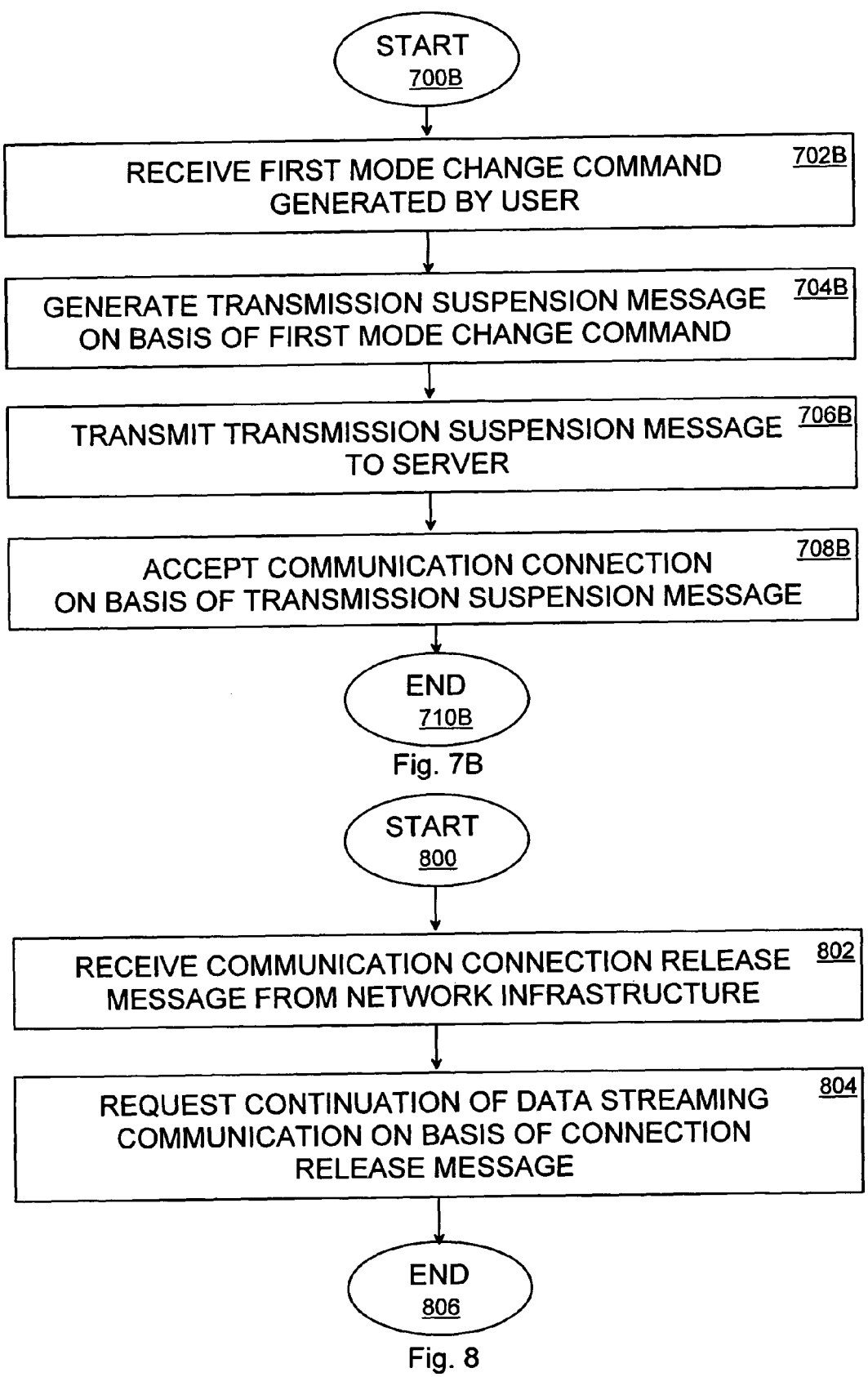

COMMUNICATION METHOD, MOBILE TERMINAL, AND COMPUTER PROGRAM

FIELD

The invention relates to a communication method in a wireless telecommunications system, a mobile terminal in a wireless telecommunications system, and a computer program for executing a computer process in a wireless telecommunications system.

BACKGROUND

As the data communication capacity and the capabilities of the wireless telecommunications system have increased dramatically and a great variety of digital services have become available to users, the information flow to a mobile terminal may in some cases exceed the limits of the user and/or the limits of the user interface. As an example, such a situation may occur when a service involving data streaming communication is in progress, and simultaneously, a communication connection requiring the user's attention and/or the user interface is requested.

Therefore, it is useful to consider techniques to handle such situations.

BRIEF DESCRIPTION OF THE INVENTION

An object of the invention is to provide an improved method, mobile terminal and computer program.

According to a first aspect of the invention, there is provided a communication method in a wireless telecommunications system including a network infrastructure connected to at least one server for providing data streaming communication where a data stream is communicated from the server to a mobile terminal over a radio interface provided by the network infrastructure, the method including: performing data streaming communication to the mobile terminal; receiving a communication connection request message from the network infrastructure in the mobile terminal; indicating reception of the communication connection request to a user of the mobile terminal; receiving in the mobile terminal a first mode change command generated by the user; requesting for suspension of the data streaming communication on the basis of the first mode change command; and accepting the communication connection on the basis of the first mode change command.

According to a second aspect of the invention, there is provided a mobile terminal of a wireless telecommunications system including a network infrastructure connected to at least one server for providing data streaming communication where a data stream is communicated from the server to a mobile terminal over a radio interface provided by the network infrastructure, the mobile terminal including: a communicating unit for performing data streaming communication to the mobile terminal; a message receiving unit for receiving a communication connection request message from the network infrastructure; an indicating device connected to the message receiving unit, for indicating reception of the communication connection request message to the user of the mobile terminal; a command receiving device for receiving a first mode change command generated by the user; a data streaming control unit operationally connected to the command receive device and the communicating unit, for requesting for suspension of the data streaming communication on the basis of the first mode change command; and a communication connection control unit operationally connected to the command receive device, for accepting the communication connection on the basis of the first mode change command.

According to another aspect of the invention, there is provided a computer program embodied on a computer readable medium, for executing a computer process in a wireless telecommunications system including a network infrastructure connected to at least one server for providing services for mobile terminals by using the network infrastructure, the computer process including: performing a data streaming communication to the mobile terminal; receiving a communication connection request message from the network infrastructure in the mobile terminal; indicating reception of the communication connection request to a user of the mobile terminal; receiving in the mobile terminal a first mode change command generated by the user; requesting for suspension of the data streaming communication on the basis of the first mode change command; and accepting the communication connection on the basis of the first mode change command.

Preferred embodiments of the invention are described in the dependent claims.

The method, mobile terminal and computer program of the invention provide several advantages. In a preferred embodiment of the invention, the data streaming communication is interrupted automatically when a communication connection is accepted. As a result, the end user is not required to take separate actions to accept the communication connection and interrupt the data streaming communication, thus simplifying a shift from using the data streaming service to using the communication connection. Furthermore, in some embodiments, neither is the end user required to take separate actions to resume from using the communication connection back to using the data streaming service.

LIST OF DRAWINGS

In the following, the invention will be described in greater detail with reference to the preferred embodiments and the accompanying drawings, in which FIG. 1 shows an example of the structure of a wireless telecommunications system;

FIG. 7B is a fifth flow chart illustrating a methodology according to embodiments of the invention, and FIG. 8 is a sixth flow chart illustrating a methodology according to embodiments of the invention.

DESCRIPTION OF EMBODIMENTS

Figure 1:
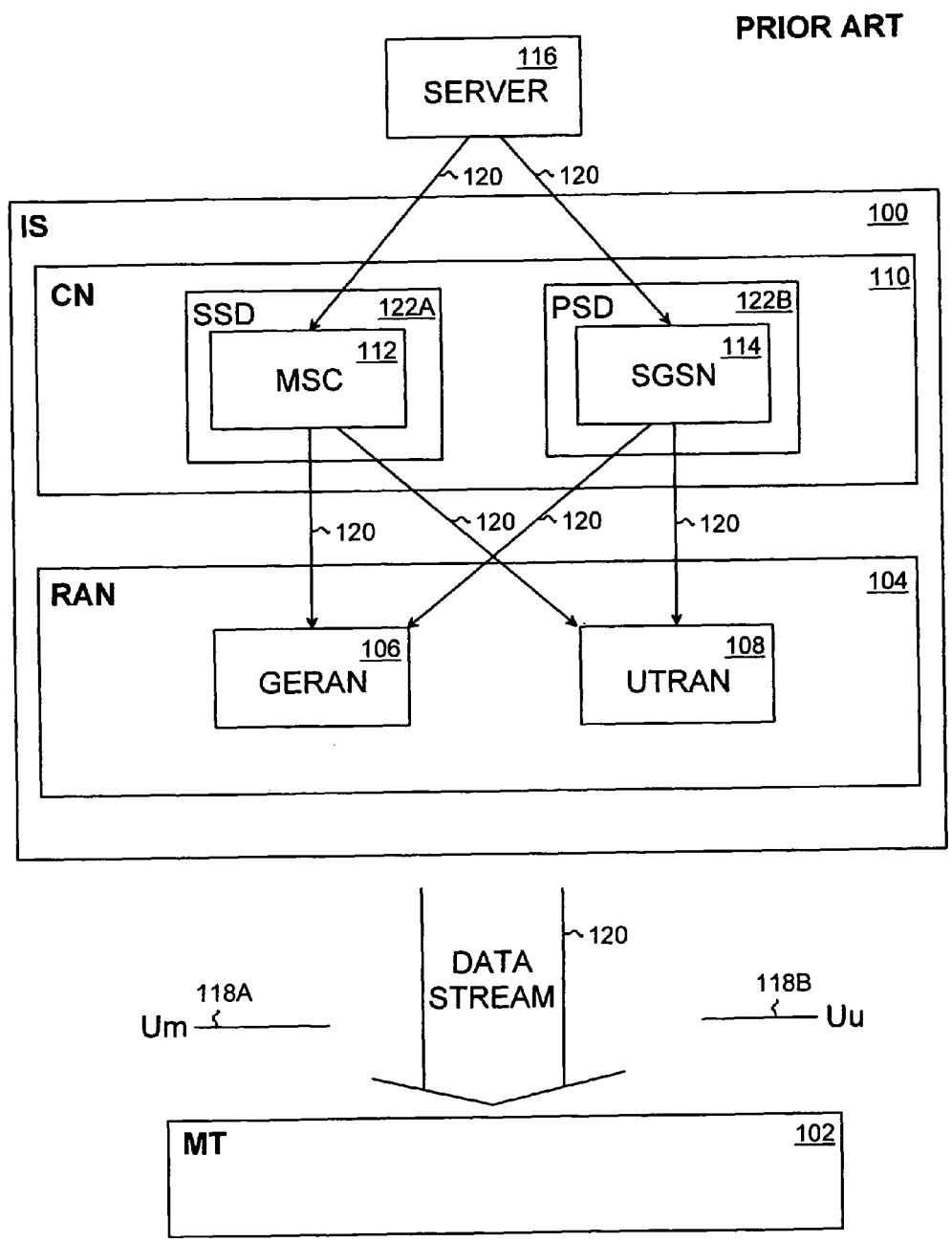

FIG. 1 illustrates an example of a wireless telecommunications system, which provides an example of a framework to which the present solution may be applied.

The wireless telecommunications system may be divided into a network infrastructure (IS) 100 and at least one mobile terminal (MT) 102.

The mobile terminal 102 may also be called user equipment, a user terminal, or a mobile phone. The mobile terminal 102 comprises at least a radio modem, which provides a radio communication link between the mobile terminal 102 and the network infrastructure 100.

The network infrastructure 100 includes terrestrial network elements and may be divided into a core network 110 (CN) and a radio access network 104 (RAN) connected to the core network 110.

The core network 110 provides a combination of exchanges and transmission equipment which together, form a basis for telecommunications network services.

The core network 110 may include a packet-switched domain 122B (PSD) for providing packet-switched telecommunications services for the mobile terminal 102. In the example, the packet-switched domain 122B includes an SGSN 114 (Serving GPRS Support Node) connected to the radio access network 104.

The core network 110 may include a circuit-switched domain 122A (SSD) for providing circuit-switched telecommunications services for the mobile terminal 102. In the example, the circuit-switched domain 122A is represented by an MSC 112 (Mobile Switching Center) connected to the radio access network 104.

The radio access network 104 provides radio resources for the telecommunication services. In the example, the radio access network 104 includes a UMTS Terrestrial Radio Access Network 108 (UTRAN) and a GSM EDGE (Enhanced Data rates for Global Evolution) Radio Access Network 106 (GERAN). The radio access network 104 is responsible of an infrastructure part of the radio interface 118A, 118B between the network infrastructure 100 and the mobile terminal 102.

The UTRAN 108 represents a third generation radio access technology and is typically implemented with Wideband Code Division Multiple Access (WCDMA) radio access technology. The radio interface 118B provided by the UTRAN is called Uu.

The UTRAN 108 typically comprises Radio Network Controllers (RNC) and Node B's. The structure of the UTRAN 108 is known to one skilled in the art and only details relevant to the present solution are described in detail.

The GERAN 106 is typically implemented with Time Division Multiple Access (TDMA) radio access technology. The GERAN 106 may include GSM (Global System for Mobile Communications) and GSM based systems, such as GSM/EDGE system (Enhanced Data rates for Global Evolution), GPRS system (General Packet Radio Service), and/or and E-GPRS system (Enhanced GPRS). The radio interface 118A provided by the GERAN is called Um.

The GERAN 106 typically comprises base stations and base station controllers. The structure of the GERAN 106 is known to one skilled in the art and only details relevant to the present solution are described in detail.

The network infrastructure 100 is connected to a server 116 which provides a data streaming communication service where a data stream 120 is communicated from the server 116 to the mobile terminal 102 over the radio interface 118A, 118B. The server 116 may be located in the wireless telecommunications system or it may be connected to the wireless telecommunications system over an external network, such as the Internet.

The data packets of the data stream 120 may be stored in the server 116 or routed via the server 116. When the data stream 120 is routed via the server 116, the source of the data stream 120 may be another server or a real-time source, such as a video camera, an audio player, and/or a broadcasting system.

The server 116 and the mobile terminal 102 may utilize standardized protocols, such as an RTSP (Real Time Streaming Protocol), in the data streaming communication. The RTSP is an application-level protocol for the delivery of real-time data. The RTSP establishes and controls either one or more time-synchronised streams of continuous media.

The data stream 120 is typically a flow of information bits, which may be delivered continuously or in separate data packets. The data rate associated with the data stream 120 may depend e.g. on the capacity of the network infrastructure 100, the capacity of the mobile terminal 102, the characteristics of the service and/or the prevailing load of the wireless telecommunications system.

In an embodiment of the invention, the data stream 120 delivers a real-time streaming service, such as a video streaming service and/or a voice streaming service. In such a case, it is typical that the contents of the service require active attention from the user. The user may not be willing to lose any of the contents if the service session is interrupted. Furthermore, it may be possible that the communication of the data stream 120 may not be initiated from the beginning. Such a situation may occur if the service provides a data stream 120 which includes live data feeds, such as those originating from real-time audio and/or video broadcast.

The data stream 120 may be communicated to the radio access network 104 through the circuit-switched domain 122A and/or the packet-switched domain 122B, depending e.g. on the characteristics of the data streaming communication service and the properties of the wireless telecommunications system. The choice of the domain is not, however, critical from the point of view of the present solution.

The data stream 120 may be communicated from the radio access network 104 to the mobile terminal 102 through the UTRAN 104 and/or the GERAN, depending e.g. on the characteristics of the radio access network 104, the characteristics of the mobile terminal 102, and the requirements of the data streaming communication service. The choice of the radio access technology used for delivering the data stream 120 to the mobile terminal is not, however, a critical detail from the point of view of the present solution.

Figure 2:
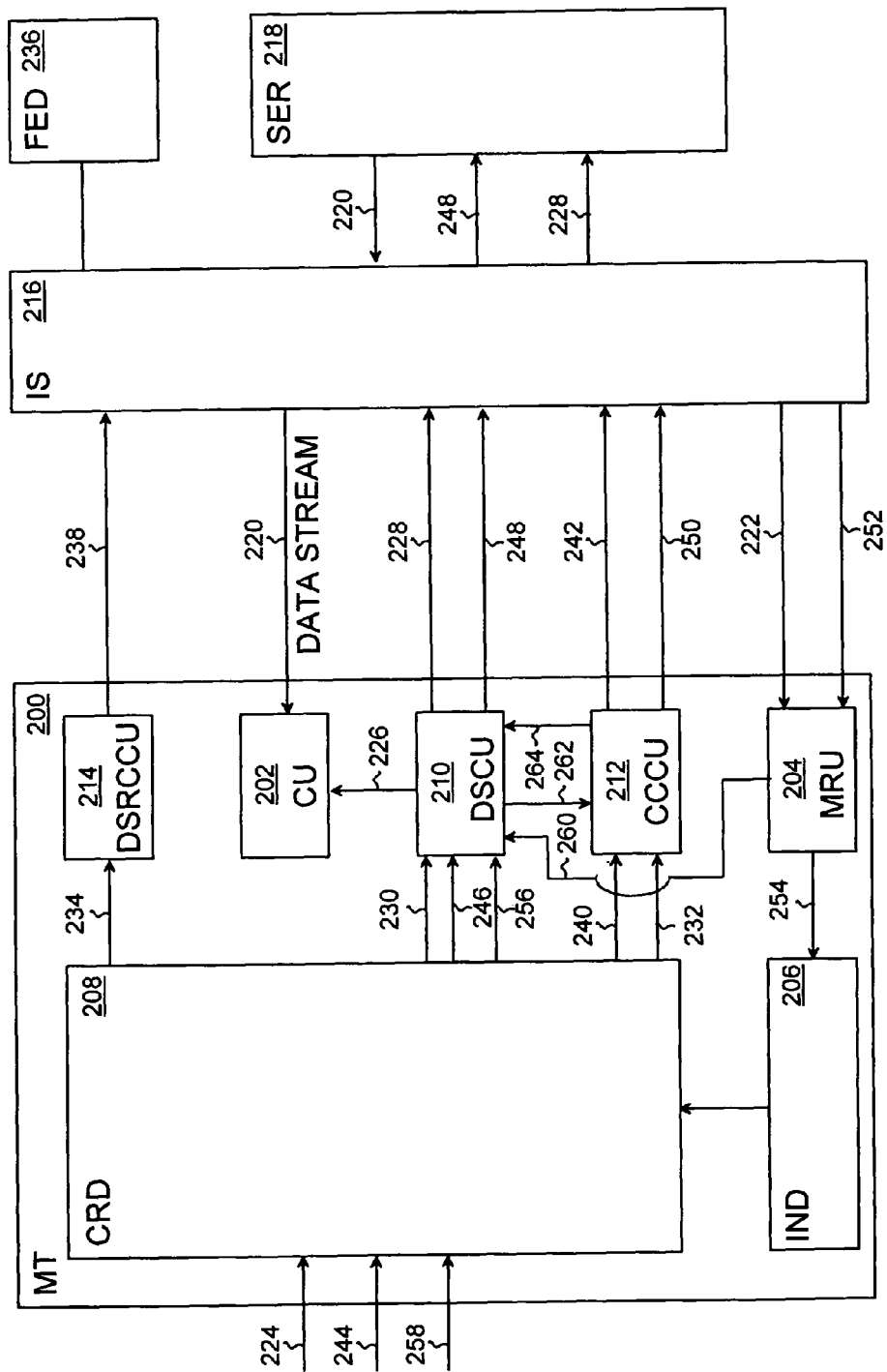
FIG. 2 is a block diagram illustrating an example of the structure of a mobile terminal according to embodiments of the invention.

With reference to FIG. 2, the server 218 directs the data stream 220 into the network infrastructure 216, which transmits the data stream 220 to the mobile terminal 200 over the radio interface 118A, 118B.

A communicating unit 202 (CU) comprised by the mobile terminal 200 receives the data stream 220.

The communicating unit 202 may include a radio receiver for receiving a radio signal carrying the data stream 220. Furthermore, the communicating unit 202 may include processing devices, such as a digital computer and software, for processing the bits of the data stream 220 and implementing communication protocols, such as the RTSP.

The communicating unit 202 may further include elements, such as software and a transmitter, to implement data transfer connections, such as HSDPA (High-Speed Downlink Packet Access) operating on top of the UTRAN platform. The HSDPA provides efficient downlink data streaming communication and involves bi-directional signalling between the network infrastructure 216 and the mobile terminal 200. The signalling in the downlink direction may deliver information on the characteristics, such as coding and modulation characteristics, of data packets transmitted from the network infrastructure 216. The signalling in the uplink direction may include channel information and information about whether or not received data packets were decoded successfully.

While the data streaming communication between the mobile terminal 200 and the server 218 is in progress, a communication connection request message 222 may be generated in the network infrastructure 216 and transmitted to the mobile terminal 200 over the radio interface 118A, 118B. The communication connection request message 222 typically informs the mobile terminal 200 of a need to contact the network infrastructure 216 to establish a communication connection. Such a communication connection may be e.g. a voice call connection to a far end device (FED) 236, such as another mobile terminal or a phone terminal of a Public Switched Telephone Network (PSTN). The communication connection may be based on circuit-switched or packet-switched communication.

A message receiving unit 204 (MRU) of the mobile terminal 200 receives the communication connection request message 222. The message receiving unit 204 may be implemented with a radio receiver, which receives the radio signal carrying the communication connection request message 222. Furthermore, the message receiving unit 204 may include a digital computer and software for processing the radio signal and for extracting the communication connection request message 222 from the radio signal.

The communication connection request message may relate to an incoming voice call, an incoming data call, an incoming fax, and/or an incoming data packet connection request, for example. The incoming data call may be based, for example, on a PoC (Push to talk over Cellular) service used in the GPRS mobile terminals. In an embodiment, the communication connection request message 222 may be a "SETUP" message of the GSM system, which "SETUP" message indicates that a circuit-switched call has arrived at the mobile terminal 200.

The message receiving unit 204 generates an indication signal 254 indicating that the communication connection request message 222 has been received at the mobile terminal 200, and delivers the indication signal 254 to an indicating device (IND) 206 connected to the message receiving unit 204. The indication signal 254 may include information, such as the phone number, on the far end device 236 from which the communication connection request was originated.

The indicating device 206 indicates the reception of the communication connection request message 222 to the user of the mobile terminal 200.

The indicating device 206 is typically comprised by a user interface of the mobile terminal 200.

The indicating device 206 may include a display, which visually indicates the reception of the communication connection request message 222 by using lights, alphanumeric symbols, and/or graphics. The display may show the information contents, such as the phone number, of the indication signal 254 to the user.

The indicating device 206 may also include an acoustic indication device, such as a buzzer or a loudspeaker, which generates a sound as an indication of the reception of the communication connection request message 222 at the mobile terminal 200.

The indicating device 206 may also include a mechanical indicator which indicates the reception of the communication connection request message 222 at the mobile terminal 200 as mechanical vibration.

As a result of the reception of the communication connection request message 200 being indicated to the user, the user may take action to accept the communication connection. In such a case, the user may generate a first mode change command 224, which is received in a command receive device (CRD) 208.

The command receive device 208 is typically comprised by the user interface of the mobile terminal 200.

The command receive device 208 may include a mechanical switch, such as a key, which converts a touch of the user into an electric signal. In an embodiment of the invention, the mechanical switch is a selection key for accepting incoming calls.

The command receive device 208 may be comprised by a touch screen, which includes a section dedicated to receiving the first mode change command 224.

The command receive device 208 may further include a voice activation decoder, which converts an acoustic first mode change command 224 into the first mode change command 230 in electric form.

The mobile terminal 200 includes a data streaming control unit 210 (DSCU) operationally connected to the command receive device 208 and the communicating unit 202.

The data streaming control unit 210 requests for suspension of the data streaming communication on the basis of the first mode change command 224. The suspension of the data streaming communication interrupts the communication of the data stream 220.

When the data streaming control unit 210 is connected operationally to the command receive device 208, one or more functional units passing indication of the reception of the first mode change command 224 may exist between the command receive device 208 and the data streaming control unit 210.

In an embodiment of the invention, the data streaming control unit 210 generates a transmission suspension message 228 on the basis of the first mode change command 224, and transmits the transmission suspension message to the server 218 over the radio interface 118A, 118B provided by the network infrastructure 216. The transmission suspension message 228 informs the server 218 to suspend the transmission of the data stream 220.

The transmission suspension message 228 may include, for example, an RTSP PAUSE command, which temporarily halts the data stream 220 without releasing any other resources of the server 218.

The data streaming control unit 210 may further deliver a receive suspension signal 226 to the communicating unit 202. The communicating unit 202 suspends the reception of the data stream 220 after receiving the receive suspension signal 226.

The data streaming control unit 210 may be implemented with a computer and a computer program for executing computer processes. The data streaming control unit 210 may further be connected to a transmitter of the mobile terminal 200 in order to realize the radio signal transmission when communicating the transmission suspension message 228 to the network infrastructure 200.

The mobile terminal 200 further includes a communication connection control unit 212 operationally connected to the command receive device 208.

The communication connection control unit 212 accepts the communication connection on the basis of the first mode change command 224. When the communication connection is accepted, procedures, such as call establishment procedures, to establish the communication connection may be initiated in the mobile terminal 200. In an embodiment, the communication connection control unit 212 transmits a communication connection acceptance message 242 to the network infrastructure 216 on the basis of the first mode change command. The communication connection acceptance message 242 informs an infrastructure network element, such as the MSC and/or the SGSN, to switch on the communication connection between the mobile terminal 200 and the far end device 236. As an example, if the communication connection is a GSM circuit switched call, the network infrastructure 216 sends a "SETUP" message to the mobile terminal 200. When accepting the incoming call, the mobile terminal 200 sends a "CONNECT" message to the network infrastructure 216.

When the communication connection control unit 212 is connected operationally to the command receive device 208, one or more functional units passing indication of reception of the first mode change command 224 may exist between the command receive device 208 and the communication connection control unit 212.

In an embodiment of the invention, the command receive device 208 converts the first mode change command 224 into an electric form and delivers the first mode change command 230 in electric form into the data streaming control unit 210 connected to the command receive device 208. The data streaming control unit 210 receives the first mode change command 230 in electric form and suspends the data streaming communication on the basis of the first mode change command 230.

In an embodiment of the invention, the command receive device 208 converts the first mode change command 224 into an electric form and delivers the first mode change command 240 in electric form into the communication connection control unit 212 connected to the command receive device 208. The communication connection control unit 212 receives the first mode change command 240 in electric form and accepts the communication connection after receiving the first mode change command 240.

The communication connection control unit 212 may be implemented with, for example, a digital computer and a computer program for processing software. The communication connection control unit 212 may be connected to a radio transmitter of the mobile terminal 200 in order to provide radio resources for transmitting the communication connection acceptance message 242 to the network infrastructure 216.

In an embodiment of the invention, the data streaming control unit 210 is connected to the communication connection control unit 212. The existence of the communication connection acceptance message 242 may be indicated with an indication signal 264 to the data streaming control unit 210 in order to inform the data streaming control unit 210 that a communication connection establishment procedure has been initiated. Based on the indication signal 264, the data streaming control unit 210 may initiate a data streaming suspension procedure, which may include generating the transmission suspension message 228 and transmitting the transmission suspension message 228 to the server 218 over the radio interface 118A, 118B.

In an embodiment of the invention, the data streaming control unit 210 generates the transmission suspension message 228 and informs the communication connection control unit 212 that such a transmission suspension message 228 exists by issuing an indication signal 262. Based on the indication signal 262, the communication connection control unit 212 accepts the communication connection by initiating the communication connection establishment procedure including, for example, transmitting the communication connection acceptance message 242 to the network infrastructure 216. The transmission suspension message 228 is then transmitted to the server 218 over the radio interface 118A, 118B.

In an embodiment of the invention, the mobile terminal 200 includes a data streaming radio connection control unit (DSRCCU) 214 operationally connected to the command receive device 208, for generating a connection suspension message 238 on the basis of the first mode change command 224. The connection suspension message 238 is transmitted to the network infrastructure 216.

The first mode change command 224 may generate an electric signal 234 in the command receive unit 208, which electric signal 234 is delivered to the data streaming radio connection control unit 214. The electric signal 234 may initiate the generation and transmission of the connection suspension message 238.

The connection suspension message 238 may request the network infrastructure 216 to release a radio connection to provide the data streaming communication. The connection suspension message 238 releases, for example, the DPDCH (Dedicated Physical Data Channel) and DPCCH (Dedicated Physical Control Channel) used in the HSDPA communication. In such a case, the communication connection may be provided, for example, by the GERAN domain of the mobile terminal 200.

The data streaming radio connection control unit 214 may be implemented with a digital processor and a computer program for executing a computer process. The data streaming radio connection control unit 214 may be connected to a transmitter of the mobile terminal 200, which transmitter establishes the radio connection required for transmitting the connection suspension message 238 to the network infrastructure 216.

It should be noted that the first mode change command 224 activates the data streaming control unit 210 to request for suspending the data streaming communication, and the communication connection control unit 212 to accept the communication connection. The timing of the request for the suspension and the acceptance of the communication connection depends on the embodiment. In an embodiment, the request for suspension is generated prior to accepting the communication connection in order to prevent the data streaming communication and the communication connection from overlapping temporarily.

The communication connection may be released either by the near end device, i.e. the mobile terminal 200, or the far end device 236.

In the near end release case, the user may generate a second mode change command 244 in the command receive device 208, which second mode change command 244 may be converted into a second mode change command 232, 246 in an electric form by the command receive device 208.

In an embodiment of the invention, the communication connection control unit 212 receives the second mode change command 232 and releases the communication connection on the basis of the second mode change command 232. The communication connection control unit 212 transmits a communication connection release message 250 to the network infrastructure 216, which communication connection release message 250 initiates communication connection release procedures in the network infrastructure 216 and the far end device 236. For example in the case of a GSM circuit switched call, the mobile terminal 200 sends successive "DISCONNECT" and "RELEASE" messages to the network infrastructure 216.

In an embodiment of the invention, the data streaming control unit 210 receives the second mode change command 246 and requests for continuation of the data streaming communication on the basis of the second mode change command 246. The data streaming control unit 210 may transmit a data stream continuation request message 248, such as an RSTP PLAY message, to the server 218 to inform the server 218 to continue the transmission of the data stream 220.

It should be noted that the second mode change command 244 activates the data streaming control unit 210 to request for continuation of the data streaming communication, and the communication connection control unit 212 to release the communication connection. The timings of the request for continuation and the release of the communication connection depend on the embodiment. In an embodiment, the request for continuation is generated after releasing the communication connection in order to prevent the data streaming and the communication connection from overlapping temporarily.

In an embodiment of the invention, the communication connection is released either by the far end device 236 or the network infrastructure 216. In such a case, the network infrastructure generates a communication connection release message 252 and transmits the communication connection release message 252 to the message receiving unit 204. The message receiving unit 204 receives the communication connection release message 252.

In an embodiment of the invention, the data streaming control unit 210 is connected to the message receiving unit 204, and the data streaming control unit 210 requests for continuation of the data streaming communication on the basis of the communication connection release message 252. The message receiving unit 204 may inform the data streaming control unit 210 by issuing an information signal 260 that the communication connection release message 252 has been received. After receiving the information signal 260, the data streaming control unit 210 may request for continuation of the data stream communication by, for example, transmitting the continuation request message 248 to the server 218. In this embodiment, the reception of the communication connection release message 252 automatically initiates the request for continuation of the data streaming communication.

In an embodiment of the invention, the reception of the communication connection release message 252 may be indicated to the user by the indicating device 206. In such a case, information on the reception of the communication connection release message 252 is included in the indication signal 254.

The indication of the reception of the communication connection release message 252 may cause the user to generate a third mode change command 258, which third mode change command 258 is received by the command receive device 208. The reception of the third mode change command 258 results in generating the third mode change command 256 in an electric form, which third mode change command 256 is delivered to the data streaming control unit 210. The data streaming control unit 210 may request for continuation of the data streaming communication on the basis of the third mode change command 256.

Figure 3:
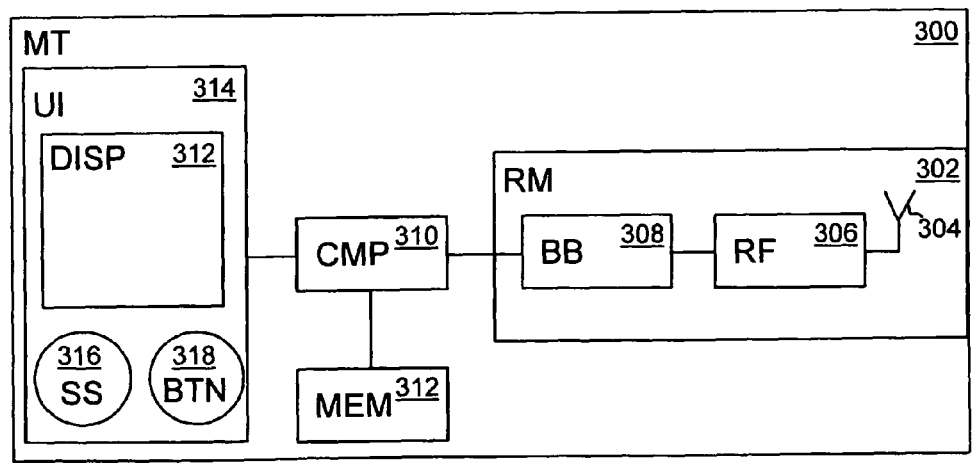
FIG. 3 shows an example of the structure of a mobile terminal.

With reference to FIG. 3, an example of a mobile terminal (MT) 300 includes a radio modem 302, a computer (CMP) 310, a memory unit 312 (MEM), and a user interface 314 (UI).

The radio modem 302 is responsible for the mobile terminal part of the radio interface 118A, 118B between the mobile terminal 300 and the network infrastructure 100. The radio modem 302 performs tasks such as transmission and reception of radio signals with the network infrastructure 100, controlling the radio resources, and signalling.

The radio modem 302 typically includes an antenna 304, radio frequency parts 306 and base band parts 308. The operation and structure of the aforementioned radio modem parts are known one skilled in the art.

In an embodiment of the invention, the mobile terminal 300 includes a plurality of radio modems 302, each radio modem 302 supporting different radio access technologies, such as the GSM and the WCDMA. The plurality of radio modems may use shared resources, such as some of the radio frequency parts 306.

The radio modem 302 provides a radio connection to carry the data stream 220 from the network infrastructure 100 to the mobile terminal 300.

The radio modem 302 may further provide the radio connection required for the communication connection between the mobile terminal 300 and the far end device 236 via the network infrastructure 100.

The radio modem 302 may perform tasks related to the communicating unit 202, the data streaming control unit 210, the communication connection control unit 212, the data streaming radio connection control unit 214, and the message receiving unit 204. These tasks typically involve communication over the radio interface 118A, 118B.

The memory unit 312 may include computer programs which include instructions to execute computer processes in the computer 310.

The computer and the computer program may be used to implement the communicating unit 202, the data streaming control unit 210, the communication connection control unit 212, the data streaming radio connection control unit 214, and the message receiving unit 204.

The user interface 314 may include the command receive device 208 and the indicating device 206. The user interface 314 is connected to the computer in order to enable signal exchange associated with the electric form of the first mode change command 224, the second mode change command 244, and the third mode change command 258.

The user interface 314 may include a display 312, a sound source 316 and a key 318. The display 312 and the sound source 316 may be used for indicating the reception of the communication connection request message 222 and the communication connection release message 252.

The key 318 may be used in producing the first mode change command 224, the second mode change command 244, and the third mode change command 258.

With reference to FIGS. 4, 5, 6, 7A, 7B and 8, a methodology according to embodiments of the invention is illustrated with flow charts.

Figure 4:
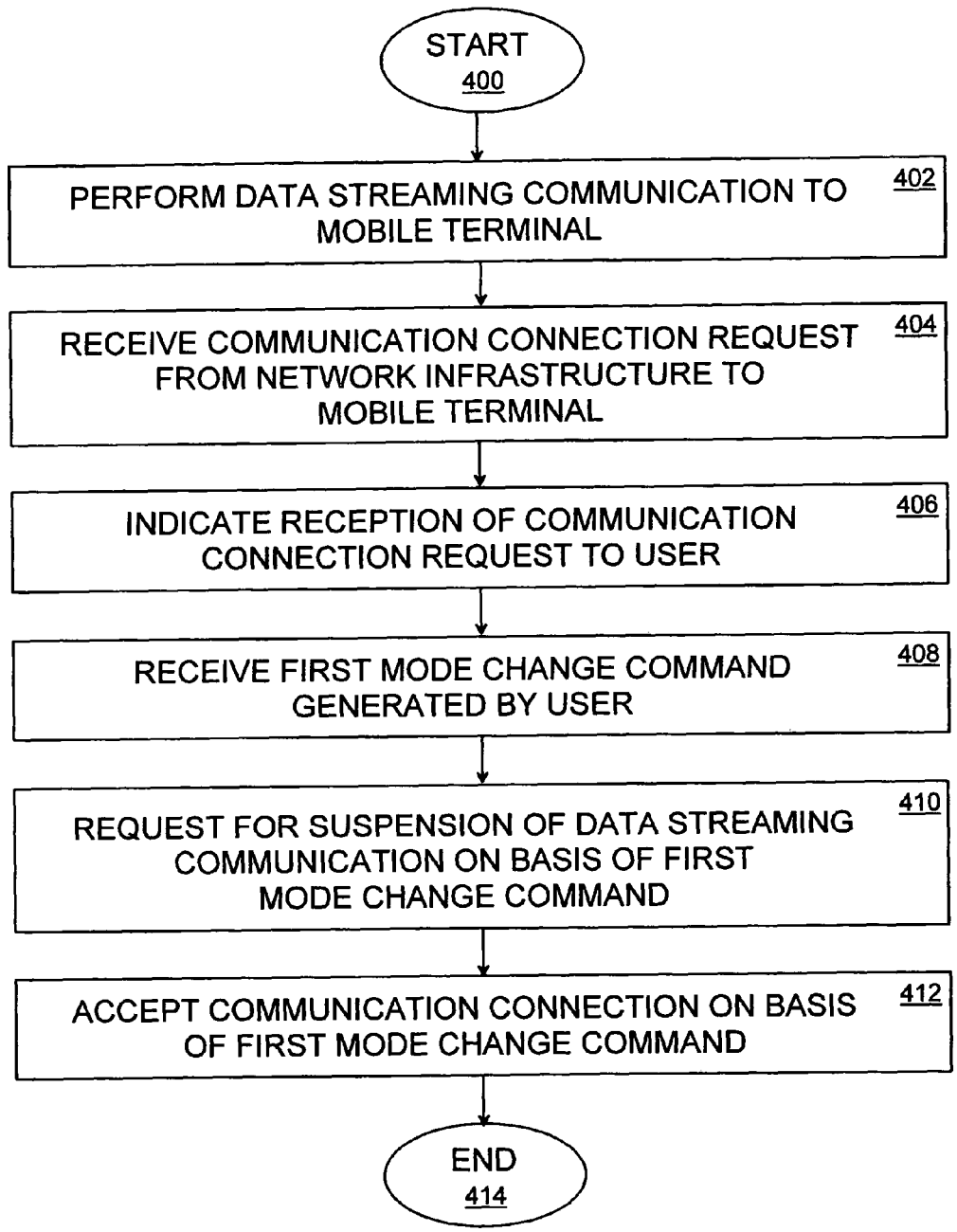
FIG. 4 is a first flow chart illustrating a methodology according to embodiments of the invention.

In FIG. 4, the method starts in 400.

In 402, data streaming communication is performed to the mobile terminal 200.

In 404, a communication connection request message 222 is received in a mobile terminal 200 from a network infrastructure 216.

In 406, reception of the communication request message 222 is indicated to a user of the mobile terminal 200.

In 408, a first mode change command 224 generated by the user is received in the mobile terminal 200.

In 410, suspension of the data streaming communication is requested on the basis of the first mode change command 224.

In 412, a communication connection is accepted on the basis of the first mode change command 224.

In 414, the method ends.

Figure 5:
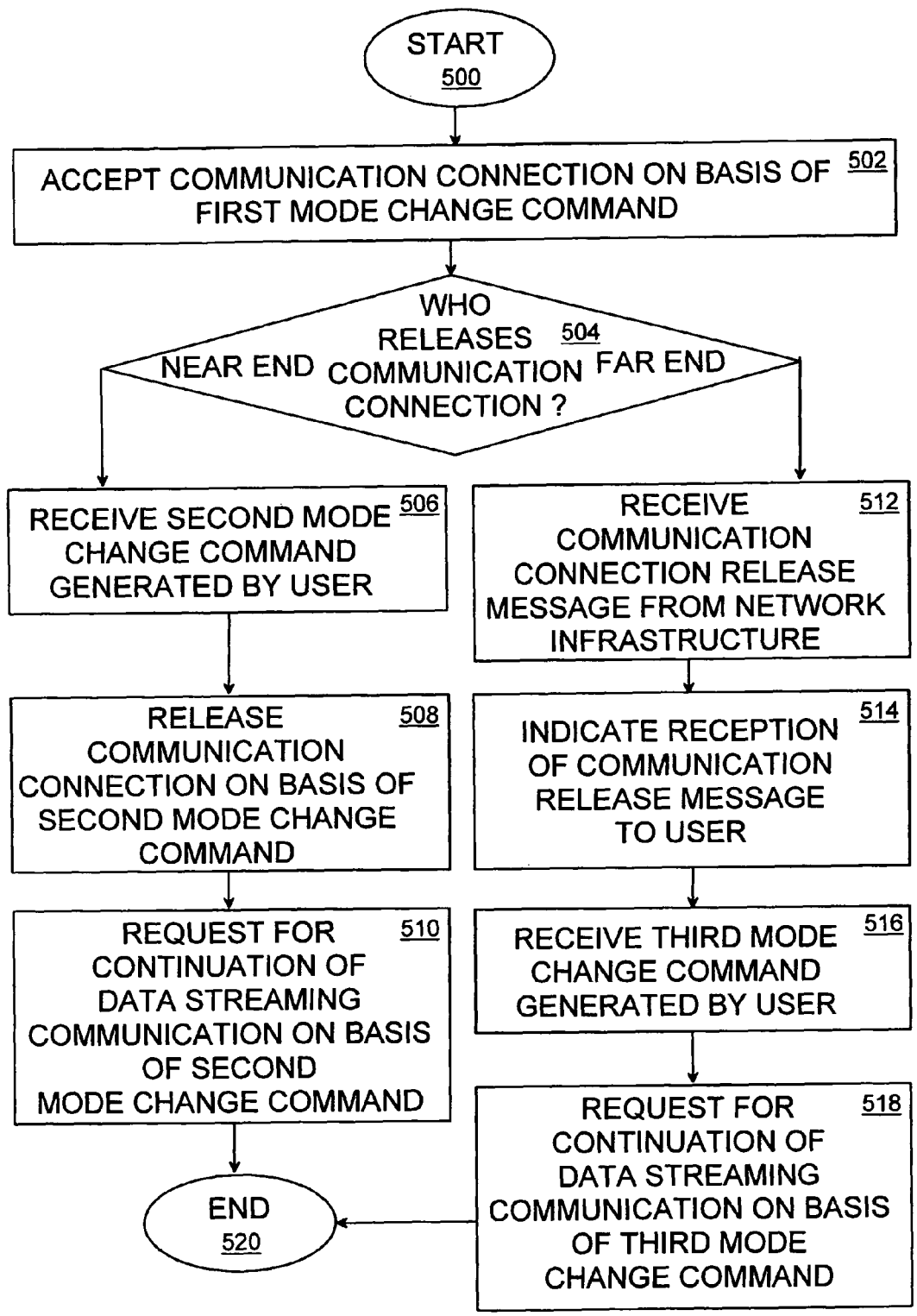
FIG. 5 is a second flow chart illustrating a methodology according to embodiments of the invention.

With reference to FIG. 5, the method starts in 500.

In 502, a communication connection is accepted on the basis of a first mode change command 224.

In 504, the method divides into two cases. In the first case, the communication connection is released by a near end device, and in the second case, the communication connection is released either by a far end device 236 and/or the network infrastructure 216.

In the first case, a second mode change command 244 generated by the user is received in 506.

In 508, the communication connection is released on the basis of the second mode change command 244.

In 510, continuation of the data streaming communication is requested for on the basis of the second mode change command 244.

In the second case, a communication connection release message 252 is received from the network infrastructure 216 in 512.

In 514, the reception of the communication release message 252 is indicated to the user.

In 516, a third mode change command 258 generated by the user is received.

In 518, continuation of the data stream communication is requested for on the basis of the third mode change command 258.

In 520, the method ends in the first case and the second case.

Figure 6:
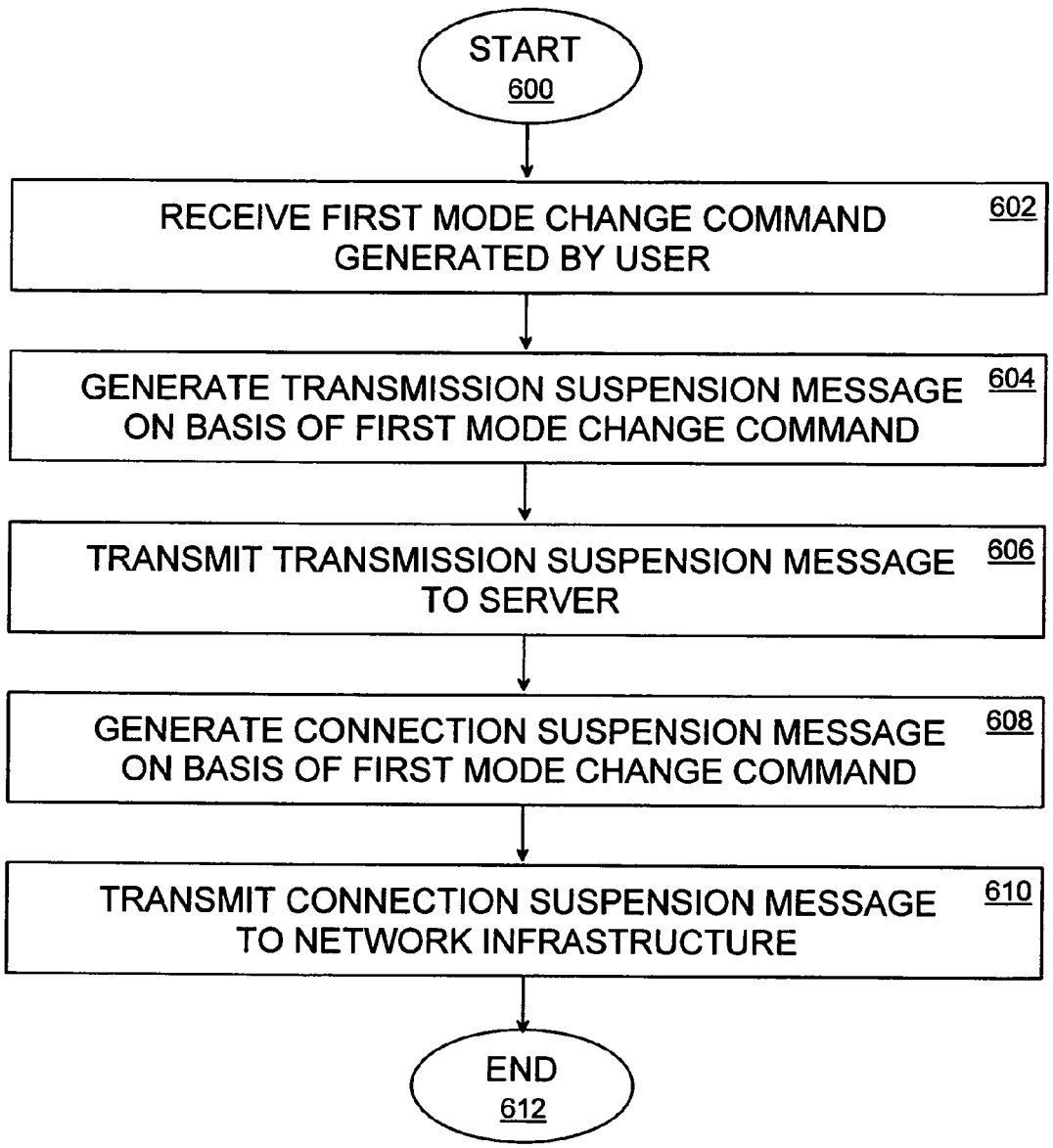
FIG. 6 is a third flow chart illustrating a methodology according to embodiments of the invention.

With reference to FIG. 6, the method starts in 600.

In 602, a first mode change command 224 generated by the user is received.

In 604, a transmission suspension message 228 is generated on the basis of the first mode change command 224, the transmission suspension message 228 informing the server 218 to suspend the transmission of the data stream 220.

In 606, the transmission suspension message 228 is transmitted to the server 218 over the radio interface 118A, 118B provided by the network infrastructure 216.

In 608, a connection suspension message 238 is generated on the basis of the first mode change command 224, the connection suspension message 238 requesting the network infrastructure 216 to release the radio connection providing the data streaming communication.

In 610, the connection suspension message 238 is transmitted to the network infrastructure 216.

In 612, the method ends.

Figure 7A:
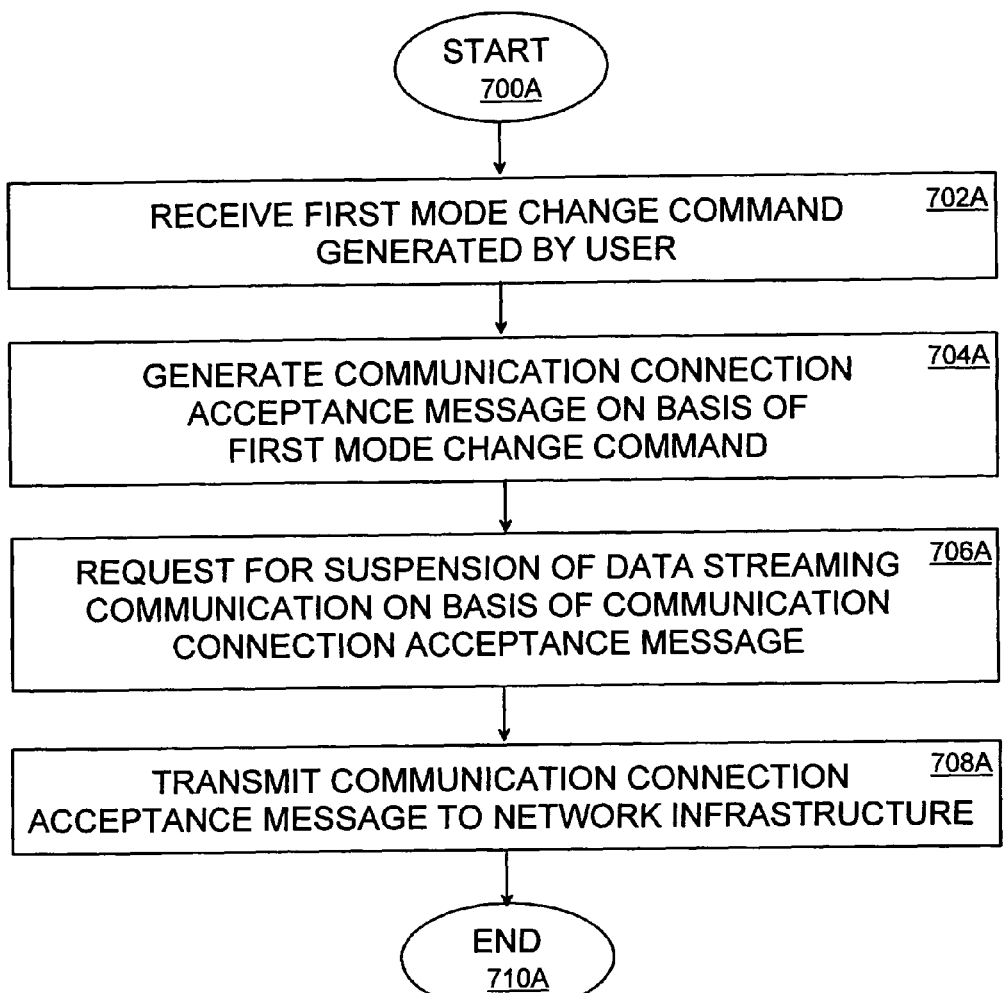
FIG. 7A is a fourth flow chart illustrating a methodology according to embodiments of the invention.

With reference to FIG. 7A, the method starts in 700A.

In 702A, a first mode change command 224 generated by the user is received.

In 704A, a communication connection acceptance message 242 is generated on the basis of the first mode change command 224.

In 706A, suspension of the data streaming communication is requested for on the basis of a communication connection acceptance message 242.

In 708A, the communication connection acceptance message 242 is transmitted to the network infrastructure 216.

In 710A, the method ends.

With reference to FIG. 7B, the method starts in 700B.

In 702B, a first mode change command 224 generated by the user is received.

In 704B, a transmission suspension message 228 is generated on the basis of the first mode change command 224, the transmission suspension message 228 informing the server 218 to suspend transmission of the data stream 220.

In 706B, the transmission suspension message 228 is transmitted to the server 218 over the radio interface 118A, 118B provided by the network infrastructure 216.

In 708B, the communication connection is accepted on the basis of the transmission suspension message 228.

In 710B, the method ends.

With reference to FIG. 8, the method starts in 800.

In 802, a communication connection release message 252 is received from the network infrastructure 216.

In 804, continuation of the data stream communication is request for on the basis of the connection release message 252.

In 806, the method ends.

In an aspect, the invention provides a computer program for executing a computer process, of which embodiments are shown and described in conjunction with FIGS. 4, 5, 6, 7A, 7B and 8. The computer program may be stored in the memory unit 312 and executed in the computer of the mobile terminal 300.

The computer program may be embodied on a computer readable medium, such as a CD (Compact Disc), a hard drive, a diskette, and a portable memory unit. The computer program may further be transferred with en electric signal in a data network, such as the Internet.

Even though the invention has been described above with reference to an example according to the accompanying drawings, it is clear that the invention is not restricted thereto but it can be modified in several ways within the scope of the appended claims.

The invention claimed is:

1. A method, comprising:
performing data streaming communication with a server connected to a network infrastructure providing a radio interface connection, wherein the server is external to the network infrastructure;
receiving a communication connection request message from the network infrastructure;
indicating reception of the communication connection request on a user interface;
receiving a first mode change command via the user interface;
generating a transmission suspension message on the basis of the first mode change command, the transmission suspension message informing the server to suspend transmission of the data stream;
transmitting the transmission suspension message to the server over the radio interface provided by the network infrastructure;
accepting from the network infrastructure the communication connection on the basis of the first mode change command;
receiving a second mode change command via the user interface;
releasing the communication connection on the basis of the second mode change command; and
requesting for continuation of the data streaming communication on the basis of the second mode change command.

2. The method of claim 1, further including:
generating a communication connection acceptance message on the basis of the first mode change command;
requesting for suspension of the data streaming communication on the basis of the communication connection acceptance message; and
transmitting the communication connection acceptance message to the network infrastructure.

3. The method of claim 1, further including:
accepting the communication connection on the basis of the transmission suspension message.

4. The method of claim 1, further including:
generating a connection suspension message on the basis of the first mode change command, the connection suspension message requesting the network infrastructure to release a radio connection providing the data streaming communication; and
transmitting the connection suspension message to the network infrastructure.

5. The method of claim 1, further comprising:
performing the data streaming communication by communicating with the server on an application level; and requesting for the suspension of the data streaming communication from the server on the application level on the basis of the first mode change command.

6. A method, comprising:

performing data streaming communication with a server connected to a network infrastructure providing a radio interface connection, wherein the server is external to the network infrastructure;

receiving a communication connection request message from the network infrastructure;

indicating reception of the communication connection request on a user interface;

receiving a first mode change command via the user interface;

generating a transmission suspension message on the basis of the first mode change command, the transmission suspension message informing the server to suspend transmission of the data stream;

transmitting the transmission suspension message to the server over the radio interface provided by the network infrastructure;

accepting from the network infrastructure the communication connection on the basis of the first mode change command;

receiving a communication connection release message from the network infrastructure;

indicating the reception of the communication connection release message on the user interface;

receiving a second mode change command via the user interface; and requesting for continuation of the data streaming communication on the basis of the second mode change command.

7. The method of claim 6, further including:

generating a communication connection acceptance message on the basis of the first mode change command;

requesting for suspension of the data streaming communication on the basis of the communication connection acceptance message; and transmitting the communication connection acceptance message to the network infrastructure.

8. The method of claim 6, further including:

accepting the communication connection on the basis of the transmission suspension message.

9. The method of claim 6, further including:

generating a connection suspension message on the basis of the first mode change command, the connection suspension message requesting the network infrastructure to release a radio connection providing the data streaming communication; and transmitting the connection suspension message to the network infrastructure.

10. A mobile terminal comprising:

a communicating unit for performing data streaming communication between the mobile terminal and a server connected to a network infrastructure providing a radio interface connection between the mobile terminal and the server, wherein the server is external to the network infrastructure;

a message receiving unit for receiving a communication connection request message from the network infrastructure;

an indicating device connected to the message receiving unit, for indicating reception of the communication connection request message to a user of the mobile terminal;

a command receiving device for receiving a first mode change command and a second mode change command generated by the user;

a data streaming control unit operationally connected to the command receiving device and the communicating unit, for requesting for suspension of the data streaming communication from the server on the basis of the first mode change command, wherein the data streaming control unit is configured to generate a transmission suspension message on the basis of the first mode change command, the transmission suspension message informing the server to suspend the transmission of the data stream and is configured to transmit the transmission suspension message to the server over the radio interface provided by the network infrastructure and further configured to request for continuation of the data streaming communication on the basis of the second mode change command; and a communication connection control unit operationally connected to the command receiving device and the data streaming control unit, for accepting from the network infrastructure the communication connection on the basis of the first mode change command and configured to release the communication connection on the basis of the second mode change command.

11. The mobile terminal of claim 10, wherein the communication connection control unit is configured to generate a communication connection acceptance message on the basis of the first mode change command;

the communication connection control unit is configured to transmit the communication connection acceptance message to the network infrastructure;

and the data streaming control unit is configured to request for suspension of the data streaming communication on the basis of the communication connection acceptance message.

12. The mobile terminal of claim 10, wherein the communication connection control unit is configured to accept the communication connection on the basis of the transmission suspension message.

13. The mobile terminal of claim 10, further including:

a data streaming radio connection control unit operationally connected to the command receiving device, for generating a connection suspension message on the basis of the first mode change command, the connection suspension message requesting the network infrastructure to release a radio connection providing the data streaming communication; and the data streaming radio connection control unit is configured to transmit the connection suspension message to the network infrastructure.

14. The mobile terminal of claim 10, wherein the communicating unit is configured to perform the data streaming communication by communicating between the mobile terminal and the server on an application level, and the data streaming control unit is configured to request for the suspension of the data streaming communication from the server on the application level on the basis of the first mode change command.

15. A mobile terminal comprising:

a communicating unit configured to perform data streaming communication between the mobile terminal and a server connected to a network infrastructure providing a radio interface connection between the mobile terminal and the server, wherein the server is external to the network infrastructure;

a message receiving unit configured to receive a communication connection request message and a communication connection release message from the network infrastructure;

an indicating device connected to the message receiving unit, configured to indicate reception of the communication connection request message and reception of the communication connection release message to a user of the mobile terminal;

a command receiving device configured to receive a first mode change command and a second mode change command generated by the user;

a data streaming control unit operationally connected to the command receiving device and the communicating unit, configured to request for suspension of the data streaming communication from the server on the basis of the first mode change command, wherein the data streaming control unit is configured to generate a transmission suspension message on the basis of the first mode change command, the transmission suspension message informing the server to suspend the transmission of the data stream, configured to transmit the transmission suspension message to the server over the radio interface provided by the network infrastructure, and is further configured to request for continuation of the data streaming communication on the basis of the second mode change command; and a communication connection control unit operationally connected to the command receiving device and the data streaming control unit, configured to accept from the network infrastructure the communication connection on the basis of the first mode change command.

16. The mobile terminal of claim 15, wherein the communication connection control unit is configured to generate a communication connection acceptance message on the basis of the first mode change command;

the communication connection control unit is configured to transmit the communication connection acceptance message to the network infrastructure; and the data streaming control unit is configured to request for suspension of the data streaming communication on the basis of the communication connection acceptance message.

17. The mobile terminal of claim 15, wherein the communication connection control unit is configured to accept the communication connection on the basis of the transmission suspension message.

18. The mobile terminal of claim 15, further including:

a data streaming radio connection control unit operationally connected to the command receiving device, for generating a connection suspension message on the basis of the first mode change command, the connection suspension message requesting the network infrastructure to release a radio connection providing the data streaming communication; and the data streaming radio connection control unit is configured to transmit the connection suspension message to the network infrastructure.

19. A computer program including computer program code stored on a non-transitory computer readable medium, the computer program code configured to, with a processor, cause an apparatus at least to:

perform data streaming communication between the apparatus and a server connected to a network infrastructure providing a radio interface connection, wherein the server is external to the network infrastructure;

receive a communication connection request message from the network infrastructure;

indicate reception of the communication connection request on a user interface;

receive a first mode change command via the user interface;

generate a transmission suspension message on the basis of the first mode change command, the transmission suspension message informing the server to suspend transmission of the data stream;

transmit the transmission suspension message to the server over the radio interface provided by the network infrastructure;

accept from the network infrastructure the communication connection on the basis of the first mode change command;

receive a second mode change command via the user interface;

release the communication connection on the basis of the second mode change command; and request continuation of the data streaming communication on the basis of the second mode change command.

20. The computer program of claim 19, wherein the apparatus is further caused to:

generate a communication connection acceptance message on the basis of the first mode change command;

request suspension of the data streaming communication on the basis of the communication connection acceptance message; and transmit the communication connection acceptance message to the network infrastructure.

21. The computer program of claim 19, wherein the apparatus is further caused to:

accept the communication connection on the basis of the transmission suspension message.

22. The computer program of claim 19, wherein the apparatus is further caused to:

generate a connection suspension message on the basis of the first mode change command, the connection suspension message requesting the network infrastructure to release a radio connection providing the data streaming communication; and transmit the connection suspension message to the network infrastructure.

23. A computer program including computer program code stored on a non-transitory computer readable medium, the computer program code configured to, with a processor, cause an apparatus at least to:

perform data streaming communication between the apparatus and a server connected to a network infrastructure providing a radio interface connection, wherein the server is external to the network infrastructure;

receive a communication connection request message from the network infrastructure;

indicate reception of the communication connection request on a user interface;

receive a first mode change command via the user interface;

generate a transmission suspension message on the basis of the first mode change command, the transmission suspension message informing the server to suspend transmission of the data stream;

transmit the transmission suspension message to the server over the radio interface provided by the network infrastructure;

accept from the network infrastructure the communication connection on the basis of the first mode change command;
receive a communication connection release message from the network infrastructure;
indicate reception of the communication connection release message on the user interface;
receive a second mode change command generated via the user interface; and
request continuation of the data streaming communication on the basis of the second mode change command.

24. The computer program of claim 23, wherein the apparatus is further caused to:
accept the communication connection on the basis of the transmission suspension message.

25. An apparatus comprising:
at least one radio modem,
a user interface,
at least one processor, and
at least one memory including computer program code, the at least one memory and the computer program code configured to, with the at least one processor, the at least one radio modem and the user interface, cause the apparatus at least to:
perform data streaming communication between the apparatus and a server connected to a network infrastructure providing a radio interface connection, wherein the server is external to the network infrastructure;
receive a communication connection request message from the network infrastructure;
indicate reception of the communication connection request message on the user interface;
receive a first mode change command via the user interface;
generate a transmission suspension message on the basis of the first mode change command, the transmission suspension message informing the server to suspend transmission of the data stream;
transmit the transmission suspension message to the server over the radio interface provided by the network infrastructure;
accept from the network infrastructure the communication connection on the basis of the first mode change command;
receive a second mode change command via the user interface;
release the communication connection on the basis of the second mode change command; and
request for continuation of the data streaming communication on the basis of the second mode change command.

26. The apparatus according to claim 25 further configured, with the at least one processor, the at least one radio modem and the user interface, to cause the apparatus at least to:
generate a connection suspension request message on the basis of the first mode change command, the connection suspension message requesting the network infrastructure to release radio connection providing the data streaming communication; and
transmit the connection suspension message to the network infrastructure.

27. An apparatus comprising:
at least one radio modem,
a user interface,
at least one processor, and
at least one memory including computer program code, the at least one memory and the computer program code configured to, with the at least one processor, the at least one radio modem and the user interface, cause the apparatus at least to:
perform data streaming communication with a server connected to a network infrastructure providing a radio interface connection, wherein the server is external to the network infrastructure;
receive a communication connection request message from the network infrastructure;
indicate reception of the communication connection request on a user interface;
receive a first mode change command via the user interface;
generate a transmission suspension message on the basis of the first mode change command, the transmission suspension message informing the server to suspend transmission of the data stream;
transmit the transmission suspension message to the server over the radio interface provided by the network infrastructure;
accept from the network infrastructure the communication connection on the basis of the first mode change command;
receive a communication connection release message from the network infrastructure;
indicate the reception of the communication connection release message on the user interface;
receive a second mode change command via the user interface; and
request for continuation of the data streaming communication on the basis of the second mode change command.

28. The apparatus according to claim 27 further configured, with the at least one processor, the at least one radio modem and the user interface, to cause the apparatus at least to:
generate a connection suspension request message on the basis of the first mode change command, the connection suspension message requesting the network infrastructure to release a radio connection providing the data streaming communication; and
transmit the connection suspension message to the network infrastructure.

* * * * *